United States Patent [19]

Bridgeford

[11] Patent Number: 4,777,249

[45] Date of Patent: Oct. 11, 1988

[54] CROSSLINKED CELLULOSE AMINOMETHANATE

[75] Inventor: Douglas J. Bridgeford, Champaign, Ill.

[73] Assignee: Teepak, Inc., Oak Brook, Ill.

[21] Appl. No.: 25,455

[22] Filed: Mar. 13, 1987

[51] Int. Cl.$^4$ ............................................. C08B 3/00
[52] U.S. Cl. .................................................... 536/30
[58] Field of Search ............................................ 536/30

[56] References Cited

U.S. PATENT DOCUMENTS

| | | | |
|---|---|---|---|
| 1,771,461 | 7/1930 | Lilienfeld . | |
| 2,129,708 | 9/1938 | Schreiber . | |
| 2,134,825 | 11/1938 | Hill et al. | 260/10 |
| 3,454,982 | 7/1969 | Arnold | 17/42 |
| 3,456,286 | 7/1969 | Martinek | 17/49 |
| 4,404,369 | 9/1983 | Huttunen et al. | 536/30 |
| 4,526,620 | 7/1985 | Selin et al. | 106/203 |
| 4,530,999 | 7/1985 | Selin et al. | 536/30 |
| 4,673,702 | 6/1987 | Iacoviello | 524/459 |

FOREIGN PATENT DOCUMENTS 0178292 4/1986 European Pat. Off. .

Primary Examiner—Joseph L. Schofer
Assistant Examiner—Peter D. Mulcahy
Attorney, Agent, or Firm—Michael L. Dunn

[57] ABSTRACT

A polymeric compound comprising crosslinked cellulose aminomethanate wherein 0.5 to 30 numerical percent of the cellulose hydroxy groups have been substituted with aminomethanate groups, each of the crosslinks being formed by a crosslinking agent reacted to connect at least two of the cellulose hydroxy groups, at least two of the aminomethanate groups or at least one each of the hydroxy groups and aminomethanate groups.

13 Claims, No Drawings

CROSSLINKED CELLULOSE AMINOMETHANATE

BACKGROUND OF THE INVENTION (a) Field of the Invention

This invention relates to cellulose based products and more particularly relates to viscose type products which can be formed into various products such as films and fibers.

(b) History of the Prior Art

The use of viscose has been used for an extended period of time in the manufacture of cellophane films, rayon fibers and other regenerated cellulose products. The viscose, dissolved modified cellulose, which has been commercially used in the prior art has almost universally been formed by treating cellulose with caustic soda and carbon disulfide to form cellulose xanthate which is then dissolved in weak caustic solution to form the viscose. The products formed from cellulose regenerated from this viscose have found great commercial success. Unfortunately, the carbon disulfide used in the process and by-product carbon disulfide and hydrogen sulfide from the process are extremely toxic and these products must be carefully managed.

In addition, in the traditional viscose process, regeneration of the cellulose is necessary. Furthermore, the resulting cellulose product does not lend itself to internal plasticization and requires some kind of plasticizer for handling. In the absence of plasticizer the product is brittle.

A viable alternate to the traditional viscose process would therefore be desirable.

As early as 1930 (U.S. Pat. No. 1,771,461) it was proposed that ammonia derivatives of carbon dioxide such as urea, could be reacted with cellulose to form soluble products which could subsequently be used for the manufacture of fibers and films. This process was further discussed in U.S. Pat. Nos. 2,129,708 (1938) and 2,134,825 (1938) assigned on their faces to E. I. du Pont. The viscose type products resulting from this process are esters which will be referred to herein as cellulose aminomethanates, although they may also be known as cellulose amino formates or cellulose carbamates in other references.

While the resulting final products, e.g. fibers and films, at least when made on a small scale, had fair properties, the properties, especially purity strength and solubility at comparable chain lengths, were not nearly as good as similar products made from conventional viscose, i.e. the xanthate process. Recently, in part due to increased awareness of our environment, interest has again been shown in the alternate viscose technology disclosed in the above early references. It has, for example, been disclosed in U.S. Pat. No. 4,404,369 issued in 1983, that an alkali-soluble cellulose derivative could be produced by treating cellulose with liquid ammonia having urea dissolved therein. The object was to develop a product having urea distributed through the product prior to reaction by heating. The process described nevertheless has problems in that liquid ammonia also must be contained and in addition the product still did not have properties as good as desired.

Various proposals have been made for increasing solubility of the cellulose aminomethanate product, e.g. U.S. Pat. No. 4,526,620 wherein excess urea is used to increase solubility but simultaneously creates urea contamination and U.S. Pat. No. 4,530,999 where the average chain length is reduced by radiation which unfortunately also decreases end product strength.

It was proposed in European Patent Publication No. 178,292 published Apr. 16, 1986, that an improved product could be obtained when the alkali-urea impregnated cellulose was washed with urea solution to remove hydroxide prior to heating to form the ester. While this provided some improvement in the properties of the resulting ester, uniformity and thus strength especially when large quantities of products were made, are still not as good as desired to permit substitution for most xanthate type viscose in most commercial applications.

BRIEF DESCRIPTION OF THE INVENTION

It has now been surprisingly discovered that products made from cellulose aminomethanate viscose can be made to have a tensile strength stronger than conventional products from cellulose xanthate viscose by crosslinking the cellulose aminomethanate.

In particular, the invention comprises crosslinked cellulose aminomethanate wherein 0.5 to 30 numerical percent of the cellulose hydroxy groups have been substituted with aminomethanate groups. Each of the crosslinks is formed by a crosslinking agent reacted to connect at least two of the cellulose hydroxy groups, at least two of the aminomethanate groups or at least one each of the hydroxy groups and aminomethanate groups. Desirably, there are between 0.1 and 10 crosslinks per 100 glucose units in the cellulose where crosslinking is used.

The crosslinking agent may be any effectively polyfunctional compound which will react with aminomethanate or hydroxy groups in the cellulose aminomethanate polymer.

The crosslinking agent may therefore, for example, be selected from the group consisting of polyfunctional compounds containing at least two groups selected from aldehyde, aromatic amine, carboxy, alkylhalide, acid halide, methylol, carboxylic anhydride and isocyanate groups. Particular examples of such crosslinking agents are glutaraldehyde and melamine-formaldehyde resins containing a plurality of unreacted methylol amine groups.

The invention further comprises the crosslinked cellulose aminomethanate wherein the crosslinking agent contains at least five, and desirably eight or more, atoms in the molecular chain between the reaction sites. Such crosslinking agents permit retention of flexibility while strength is enhanced.

DETAILED DESCRIPTION OF THE INVENTION

The invention comprises a crosslinked cellulose aminomethanate article which is usually a film or a fiber.

Cellulose which is aminomethanated in accordance with the present invention may be represented by the formula:

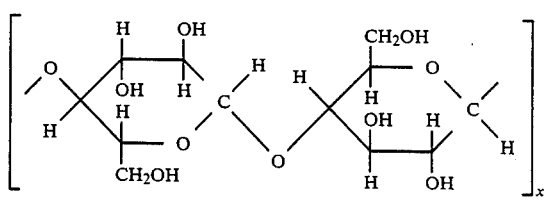

-continued

Cellulose

One half of this formula, i.e.

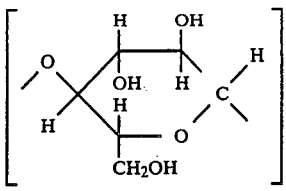

whether a dehydro derivative or whether or not it is substituted at an —OH position is referred to herein as a glucose unit. The average degree of polymerization of a cellulose (DP), whether or not it is aminomethanated at a hydroxy position, is the average number of combined glucose units. The preferred average degree of polymerization is from 300 to 650. The average of polymerization can be expressed as $DP_W$ which is the weight average DP or by $DP_V$ which is determined by calculation from a viscosity determination and correlates with $DP_W$.

The cellulose aminomethanate is formed by reaction of cellulose with certain amine oxygen containing compounds such as urea or biuret.

It is believed that the cellulose is aminomethanated in accordance with the basic formula:

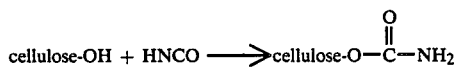

cellulose + isocyanic acid ⟶ cellulose aminomethanate

The isocyanic acid is believed to be generated at the time of reaction from urea or cyanuric acid or a similar compound, e.g.

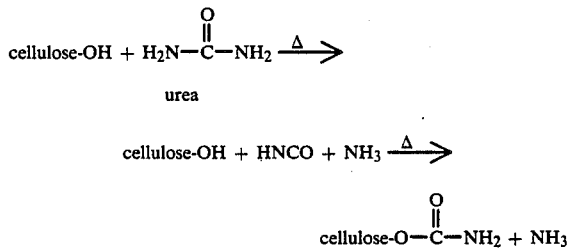

The urea may be carried into the cellulose structure by a suitable carrier such as liquid ammonia to more uniformly distribute the urea throughout the cellulose structure, as for example is described in U.S. Pat. No. 4,404,369.

The polymeric cellulose aminomethanate utilized in accordance with the invention to form the crosslinked cellulose aminomethanate desirably has from 0.5 to 30 numerical percent of the cellulose hydroxy groups substituted with aminomethanate groups and preferably has from 2 to 15 numerical percent of the cellulose hydroxy groups substituted. Prior to formation of an article, the polymeric cellulose aminomethanate desirably contains from about 3 to 30 numerical percent and preferably from about 5 to about 20 numerical percent of the cellulose hydroxy groups substituted with aminomethanate groups.

This structure permits the cellulose aminomethanate to be dissolved and handled in a manner similar to traditional viscose. An article, e.g. film or fiber, may then be extruded or spun by known means and coagulated in a manner similar to traditional viscose coagulation. The coagulation tubular film or fiber may be regenerated with a hot dilute concentration of sodium hydroxide, if desired, usually after crosslinking.

More particularly, the cellulose aminomethanate having at least 3 numerical percent of the cellulose hydroxy group substituted and preferably at least 5 numerical percent of the cellulose hydroxy groups substituted may be dissolved in from about 6 to 10 percent sodium hydroxide solution at about $-5°$ C. The quantity of cellulose aminomethanate which can be dissolved in such a solution depends largely upon the average degree of polymerization of the cellulose and upon the degree of substitution (DS) of the hydroxy groups with aminomethanate groups as well as upon temperature. Desirably, from 6 to 10 percent of the polymeric cellulose aminomethanate can be dissolved by slurrying into a 6 to 10 percent sodium hydroxide solution at 15° C. followed by cooling to subzero temperatures, e.g. less than about $-4°$ C. The reduced temperature will cause the cellulose aminomethanate to dissolve. After solution the temperature may again be permitted to rise up to 10° C. or higher.

An article, e.g. a film or fiber, extruded from the solution may be coagulated in baths similar to the baths used to coagulate traditional xanthate viscose. The bath may, for example, contain a mixture of sodium sulphate and sulfuric acid. An example of such a bath might contain from about 200 to 300 grams per liter of sodium sulphate and from about 100 to 200 grams per liter of sulfuric acid. After coagulation, the article is neutralized with acid.

Very surprisingly, the aminomethanate viscose after coagulation and washing retains a low percentage of water in the primary gel when compared with other ether-type modified cellulose compositions. The quantity of water retained is very surprisingly similar to the quantity of water retained by traditional xanthate viscose after coagulation. The quantity of water contained may be as low as from between about 300 to about 500 percent water by weight of cellulose aminomethanate which is significantly lower than other coagulated ether-type or ester type derivatives of cellulose. "Primary gel" as used herein means the coagulated and washed cellulose aminomethanate prior to initial drying.

The article may then be dried and if desired, usually subsequent to crosslinking, regenerated in a dilute caustic soda solution, e.g. 1–2 percent NaOH at from 80° to 100° C. for from about 5 to about 20 minutes. Such a finished regenerated casing may contain as few as 0.5 numerical percent or less of the cellulose hydroxy groups substituted with aminomethanate groups.

It has been found in accordance with the present invention that articles from cellulose aminomethanate having increased tensile strength can be obtained by means of crosslinking. In particular, the cellulose aminomethanate in the article, e.g. a fiber or a film, e.g. a sausage casing, may comprise a plurality of crosslinks wherein each of the crosslinks are formed by a crosslinking agent reacted to connect at least two of the cellulose hydroxy groups, at least two of the aminomethanate groups or at least one hydroxy group with at least one aminomethanate group. A crosslinking agent may be any effectively difunctional compound which will react with aminomethanate or hydroxy groups in the cellulose aminomethanate polymer.

The number of crosslinks in the cellulose aminomethanate polymer preferably ranges between about 0.1 and 10 crosslinks per 100 glucose units in the cellulose. A crosslinking compound which will react with aminomethanate or hydroxy groups in the cellulose aminomethanate polymer. A crosslinking agent may, for example, therefore be selected from the group consisting of polyfunctional compounds containing at least two groups selected from aldehyde, amine, carboxy, alkylhalide, acid halide, methylol, carboxylic anhydride and isocyanate groups. Especially desirable crosslinking agents are long chain crosslinking agents, which have been found to increase strength while minimizing embrittlement, which are potentially physiologically acceptable even though they are reacted into the system which prevents physiological absorption. Examples of preferred crosslinking agents therefore, for example, include glutaraldehyde and melamine formaldehyde type resins which contain a high methylol content to provide the reactive crosslinking groups.

"Long chain" as used herein means that the crosslinking agent contains at least 5 and preferably more, e.g. 8 or more, atoms in the molecular chain between the reaction sites.

It should be noted that crosslinking of prior art regenerated cellulose from xanthate viscose has been generally unsuccessful since the product usually comprises an impractically brittle article which in many cases has reduced, rather than increased tensile strength. The increased embrittlement or decreased elongation at break resulted in poor toughness and was unsuitable for use as a good fiber or as a packaging or casing film.

It has been unexpectedly found that articles made from cellulose aminomethanate polymer as described herein is not as subject to embrittlement by crosslinking as is traditional xanthate viscose. While not wishing to be bound by any particular theory, it is believed that since the cellulose aminomethanate has a low density of very uniformly spaced aminomethanate groups, the crosslinkage is not as detrimental to the elongation at break as is the case with conventional regenerated film. This effect is even further reduced when long chain crosslinkers are used as is previously described.

The use of glutaraldehyde, which was freshly diluted and used within a few hours of solution, suggests that a substantial increase in burst strength of the cellulose aminomethanate film in tubular form, e.g. sausage casing, can be obtained while retaining sufficient elongation at break. While there is some reduction in elongation at break and this reduction is not desirable, such reduction of elongation at break was tolerable and to a degree dramatically less than has been previously experienced in previous research on crosslinking traditional xanthate viscose cellulose.

It has been further unexpectedly discovered that if a low percentage of long chain crosslinker such as glutaraldehyde is used, very large increases in tensile strength and increases in burst strength of a tubular film such as a sausage casing film can be obtained with tolerable reductions in break elongation. Such a low loading or percentage of crosslinking agent can for example be obtained by steeping the gelled aminomethanate film in acidic solutions of 2,500 to 5,000 parts per million of glutaraldehyde or 2,500 to 5,000 parts per million of high methylol content melamine formaldehyde. Similar increases in tensile strength are obtained when the article is a fiber.

The cellulose aminomethanate of the present invention can be handled and packaged in a manner similar to traditional xanthate viscose articles. Sausage casing articles can, for example, be provided as reelstock or can be shirred and sold as shirred sticks. Methods for forming such shirred sausage casings are well known to those skilled in the art as, for example, is taught in U.S. Pat. Nos. 3,454,982 and 3,456,286.

The following examples serve to illustrate and not limit the present invention.

Various cellulose aminomethanates were prepared substantially in accordance with the teachings of U.S. Pat. No. 4,404,369. Cellulose pulp was saturated with urea dissolved in liquid ammonia, the ammonia was evaporated and the fibers containing 50 to 100% urea on the fiber weight were heated to 165° to 175° C. for periods of one to three hours. The resulting product was then extracted with hot water to remove excess urea and biuret to obtain a 0.06 to 0.25 DS cellulose carbamate which will readily dissolve in 8 to 10%, −5° C. sodium hydroxide. DS as used in these examples means the number of —OH groups substituted per glucose unit divided by three (available —OH groups). Numerous such preparations were made.

In particular examples, various preparations were made using cellulose pulp regenerated from alkali cellulose. Details of some of such preparation are as set forth in the following examples.

EXAMPLE I 220 g of cellulose which had been derived from a neutralized alkali cellulose (AC) crumb was used. The alkali cellulose crumb was made from a 1500 $DP_W$ prehydrolized sulfate dissolving wood pulp which had been steeped, mercerized, shredded and aged at 28° C. for 33 hours.

220 g of this aged AC crumb fluff was immersed in a dilute solution of urea in liquid ammonia at about 1–10 liquor ratio for 2 hours near the boiling point of the liquid ammonia. The resulting pulp was then pressed with removal of the liquid ammonia by tumbling the material at slow tumbling rate in a cylinder sparged with dry air to assist in removal of the liquid ammonia. The tumbling was continued 2½ hours to give 307 g of the urea impregnated cellulose which had approximately 44% load of urea based on the weight of the cellulose.

Several portions of the urea impregnated cellulose were converted into 50g disks of density of about 0.7–0.8 g per cc by loading a 7 oz. pan of aluminum with the 50 g of pulp, placing an aluminum foil over the assembly and the pressing in a pellet press with wood blocks at a 20,000 lb. load on the ram to give a disk approximately ¼" thick.

The disks were placed in a stainless steel tray and heated in an oven at 105° C. for preheating the disks to near 105° C. temperature. The disks were then rapidly introduced into an oven set at 202° C. which dropped the air temperature to 192° C. The disks were then cured for 15 minutes with the higher temperature rising to about 200° C. in 9 minutes. The resulting disks were then broken up and washed in hot water and tested for solubility in cold 8% sodium hydroxide solution.

A 6% dope of the disk-cured cellulose aminomethanate was made in the usual manner by adding the solid to precooled −5° C. 8% sodium hydroxide contained in a beaker with a laboratory high shear mixer and dissolving the material over a period of about 2 hours. A clear solution arose. The 400 g of 6% dope was then centrifuged 1 hour at about 2700 rpm to remove air and any traces of fiber fragment. This particular dope was stored in a refrigerator at 6° C. for approximately 24 hours prior to use to make coagulated articles which, in turn, were used for subsequent cross-linking experiments.

EXAMPLE II

A 33 hour aged AC crumb derived cellulose as previously described was used as a starting material. Approximately 150 grams of urea was dissolved in 5500 ml of liquid ammonia at −49° C. and warmed to about −43° C. The solution was used for saturating approximately 400 g of the pulp "as is" by adding the pulp in portions to the solution and pressing with a spatula to impregnate the pulp completely as it was added. The pulp was furthermore pressed 3 times within the next 45 minutes to assist in uniformity of impregnation. The steeping time was 45 minutes before the solution was decanted. The solution showed approximately 3% concentration of urea at this point. The urea-impregnated pulp was tumbled at room temperature with a 2 psi dry air sparge through the tumbler to aid escape of ammonia. A 535 g yield of the dry material at room temperature was obtained. The urea loading was approximately 36% based on the weight of the cellulose.

Approximately 150 g of this 36% addon urea cellulose was placed in a stainless steel shallow tray and pressed with the hands to approximately ⅛" thickness. The contents of the tray were preheated for 1 hour in a 105° C. oven and then quickly placed in a laboratory oven placed at 200° C. and allowed to cure for 13 minutes. Large amounts of ammonia were evolved.

The crude product weight approximately 141 g and was washed in hot water and dried before use in making the cellulose aminomethanate dope.

A 6% dope of the 350 DP$\gamma$ aminomethanate was made by dispersing at −5° C. in 8% caustic and stirring with a shear laboratory mixer for 2 hours at temperatures from −5° to 0° C. The dope was then centrifuged for 1 hour in a high speed laboratory centrifuge and was used without subsequent aging for making the 22 ml drawdown-derived gel films of Example V.

EXAMPLE III

Example II was essentially repeated to obtain a 38% addon urea cellulose. The approximately 38% loaded urea cellulose was cured in separate curing batches at 50 g per batch. The 50 g was pressed out as a uniform layer in a 5"×8" stainless steel tray and preheated to 105° C. for 1 hour prior to cure. The tray and contents were then placed in a 200° C. set laboratory oven and allowed to cure for 12 minutes. A second batch was treated similarly and a third batch at 75 g was also cured for 12 minutes. The three batches were composited to make material for use in the preparation of 7% dope.

The dope was made by adding the 28 g of the polymer to the 372 g of 8% caustic initially −8° C. Very fast dissolution took place under laboratory mixing. The stirring was done for 1 hour with a final temperature of 6° C. because of the heat of stirring. The clear dope was centrifuged at 3000 rpm in the Beckman TJ6 laboratory centrifuged to remove air prior to dope casting.

EXAMPLE IV

Six percent of cellulose aminomethanate prepared as in Example I was dissolved in dilute caustic solution and drawn into a 26 g/m$^2$, 22 mil thick film. The resulting film was coagulated in a bath containing 140 g/l $H_2SO_4$ and 240 g/l $Na_2SO_4$ for 6 minutes at 28° C. The coagulated film was then washed. The film was then treated with a 2500 ppm glutaraldehyde, 0.2% malic acid solution, pH 2.8 crosslinking solution for 5 minutes. The film was then cured at 145° C. for 7 minutes. The resulting film has an average burst strength of 14.7 psi as compared with an 11.1 psi burst strength for the same film which is not treated with the crosslinking glutaraldehyde solution. The crosslinking resulted in a 32% average increase in burst strength. The film can be readily formed into a seamed tube which can be stuffed with meat using a 69% $ZnCl_2$ solution to adhere the seam. The resulting seam is strong and contiguous.

EXAMPLE V

Example IV was repeated except that cellulose aminomethanate prepared essentially in accordance with Example II was used and a better solution was obtained. The film had an average burst strength of 14.7 psi as compared with 10.0 psi for the same uncrosslinked film representing a 47% increase in average burst strength. The film can readily be formed into a seamed tube using a 69% $ZnCl_2$ solution to adhere the seam. The resulting tube can be stuffed with meat.

EXAMPLE VI

Example IV was repeated except that a 7% solution of cellulose aminomethanate prepared substantially in accordance with Example III was formed and drawn into a 34 g/m$^2$ film. Additionally, 5000 ppm glutaraldehyde was used in crosslinking solution. The resulting film had a 21.2 psi average burst strength when compared with a 13.0 psi burst strength for the same uncrosslinked film. This represents a 63% increase in burst strength. The film could readily be rolled and formed into a seamed sausage casing using 69% $ZnCl_2$ solution to form the seam.

EXAMPLE VII

Example VI was repeated except that a much thinner 18 g/m$^2$ film was formed. The average burst strength was 15.8 psi when compared with only 9.5 psi for the same uncrosslinked film.

EXAMPLE VIII

The above films showed an increase in rewet burst strength but a reduction in conditioned tensile strength. It was, however, found that when proper conditions were selected an increase in tensile strength could also be obtained, especially the tensile strength of rewetted film.

A 7% solution of 1.7% N content 550 DP cellulose aminomethanate was prepared in 8% NuOH. The solution was centrifuged at 1200 g for 1½ hours. 30 mil drawdowns have 41–45 g/m$^2$ films which were coagulated for 8 minutes in a 28° C. solution of 17% ammonium sulfate −5% sulfuric acid solution. The films were then water washed. A film was steeped in aged 2500 ppm glutaraldehyde solution at pH 2.8 for 10 minutes and cured at 135° C. for 7 minutes. The resulting film had a tensile break at 12,270 psi dry and 3,315 psi wet as compared with the same uncrosslinked film at 9,870 psi dry and 1,390 psi wet. Comparable results are obtained when the solution is spun in a fiber.

EXAMPLE IX

Example VIII was essentially repeated except that high methylol melamine-formaldehyde (MF) was used for crosslinking in a 5000 ppm MF, 1000 ppm malic acid crosslinking solution. The film was steeped in the solution for 10 minutes at 25° C. and cured for 7 minutes at 135° C. The resulting film had a dry break at 10,140 psi as compared with 9,869 psi for the uncrosslinked control and a wet break at 2,607 psi as compared with 1,391 psi for the uncrosslinked control. Again comparable results are obtained when the solution is spun into a fiber.

EXAMPLE X

Example IX was repeated except that 2500 ppm of MF was used. The dry tensile strength was 12,803 psi and the wet tensile strength was 1,748 psi.

What is claimed is:

1. A polymeric compound comprising crosslinked cellulose aminomethanate wherein 0.5 t 30 numerical percent of the cellulose hydroxy groups have been substituted with aminomethanate groups, each of the crosslinks being formed by a crosslinking agent reacted to connect at least two of the cellulose hdyroxy groups, at least two of the aminomethanate groups or at least one each of the hdyroxy groups and aminomethanate groups.

2. The compound of claim 1 wherein the crosslinking agent is selected from the group consisting of a polyfunctional compound containing at least two groups selected from aldehyde, aromatic amine, carboxy, alkylhalide, acid halide, methylol, carboxylic anhydride and isocyanate groups.

3. The compound of claim 2 wherein the crosslinking agent is glutaraldehyde.

4. The compound of claim 2 wherein the crosslinking agent is a melamine-formaldehyde resin containing a plurality of unreacted methylol.

5. The compound of claim 2 wherein the crosslinking agent contains at least six atoms in a molecular chain between the reaction sites.

6. The compound of claim 1 wherein there are between 0.1 and 10 crosslinks per 100 glucose units in the cellulose.

7. The compound of claim 2 wherein there are between 0.1 and 10 crosslinks per 100 glucose units in the cellulose.

8. The compound of claim 3 wherein there are between 0.1 and 10 crosslinks per 100 glucose units in the cellulose.

9. The compound of claim 4 wherein there are between 0.1 and 10 crosslinks per 100 glucose units in the cellulose.

10. The compound of claim 1 wherein 5 to 20 numerical percent of the cellulose hydroxy groups have been substituted with aminomethanate groups.

11. An article manufactured from the compound of claim 1.

12. The article of claim 11 wherein the article is a fiber.

13. The article of claim 11 wherein the article is a film.

* * * * *